United States Patent
Kroetz et al.

(10) Patent No.: US 8,061,232 B2
(45) Date of Patent: Nov. 22, 2011

(54) METHODS AND APPARATUS FOR A ROBOT WRIST ASSEMBLY

(75) Inventors: Whitney B. Kroetz, Hutlo, TX (US);
Damon K. Cox, Round Rock, TX (US);
Jeffrey A. Brodine, Los Gatos, CA (US); Domingo J. Guerra, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 971 days.

(21) Appl. No.: 11/837,267

(22) Filed: Aug. 10, 2007

(65) Prior Publication Data

US 2008/0063504 A1 Mar. 13, 2008

Related U.S. Application Data

(60) Provisional application No. 60/822,200, filed on Aug. 11, 2006.

(51) Int. Cl.
*B25J 17/02* (2006.01)
*B66C 23/00* (2006.01)

(52) U.S. Cl. ...... 74/490.06; 414/744.2; 901/29

(58) Field of Classification Search ...... 74/490.01, 74/490.05, 490.06; 901/28, 29; 414/744.1, 414/744.2, 744.3, 744.4, 744.6, 744.7, 744.8; 384/476, 490, 492
See application file for complete search history.

(56) References Cited

U.S. PATENT DOCUMENTS

| | | | | |
|---|---|---|---|---|
| 5,775,169 A * | 7/1998 | Solomon et al. | ........... | 74/490.01 |
| 6,059,517 A * | 5/2000 | Begin | ........... | 414/744.6 |
| 6,279,412 B1 | 8/2001 | Beaulieu et al. | | |
| 6,546,307 B1 | 4/2003 | Hsiao | | |
| 6,574,096 B1 * | 6/2003 | Difonzo et al. | ........... | 361/679.27 |
| 2002/0089090 A1 * | 7/2002 | Steil et al. | ........... | 264/328.14 |
| 2002/0148320 A1 | 10/2002 | Kimata et al. | | |
| 2005/0050977 A1 * | 3/2005 | Kent | ........... | 74/490.06 |
| 2006/0219042 A1 | 10/2006 | Tu et al. | | |
| 2006/0245905 A1 | 11/2006 | Hudgens | | |
| 2007/0116549 A1 | 5/2007 | Rice et al. | | |
| 2008/0298945 A1 | 12/2008 | Cox et al. | | |

FOREIGN PATENT DOCUMENTS

WO WO 2006/062183 A1 6/2006
WO WO 2008/021216 A2 2/2008

OTHER PUBLICATIONS

RD 453157 A, Hybrid Ball Bearing, Jan. 10, 2002.*
International Preliminary Report on Patentability of International Application No. PCT/US2007/017762 mailed Feb. 26, 2009.
International Search Report and Written Opinion of International Application No. PCT/US07/017762 mailed Sep. 25, 2008.
International Search Report and Written Opinion of International Application No. PCT/US07/17762 mailed Oct. 1, 2008.

* cited by examiner

*Primary Examiner* — Thomas R Hannon
*Assistant Examiner* — Phillip A Johnson
(74) *Attorney, Agent, or Firm* — Dugan & Dugan, PC

(57) ABSTRACT

The present invention provides methods, apparatus, and systems for a wrist assembly including a housing having a cap and a bottom, at least one pivot at least partially enclosed in the housing and adapted to be coupled to a robot arm, and a belt coupled to the pivot and adapted to rotate the pivot about a bearing. The bottom of the housing is adapted to reflect heat away from the at least one pivot and the bearing.

21 Claims, 6 Drawing Sheets

METHODS AND APPARATUS FOR A ROBOT WRIST ASSEMBLY

The present application claims priority to U.S. Provisional Patent Application Ser. No. 60/822,200, filed Aug. 11, 2006, which is hereby incorporated by reference herein in its entirety.

FIELD OF THE INVENTION

The present invention relates to electronic device manufacturing robots, and, more specifically, to a wrist assembly for use with such manufacturing robots.

BACKGROUND

Robots used in electronic device manufacturing may be exposed to significant environmental stresses (e.g., high temperatures) that may affect the performance and/or lifespan of the robots. Thus, what is needed are methods and apparatus to improve the performance and/or lifespan of such robots.

SUMMARY OF THE INVENTION

In some aspects, the present invention provides a wrist assembly including a housing having a cap and a bottom; at least one pivot at least partially enclosed in the housing and adapted to be coupled to a robot arm; and a belt coupled to the pivot and adapted to rotate the pivot about a bearing. The bottom of the housing is adapted to reflect heat away from the at least one pivot and the bearing.

In other aspects, the present invention provides a method of extending a life of a wrist assembly which includes attaching a reflective shield to a bottom of the wrist assembly; constructing a housing of the wrist assembly from a material having a low thermal conductivity relative to a pivot of the wrist assembly; and forming at least one heat choke in the housing.

In yet other aspects, the present invention provides a robot for electronic device manufacturing that includes a wrist assembly that includes a housing having a cap and a bottom; at least one pivot at least partially enclosed in the housing and adapted to be coupled to a robot arm; and a belt coupled to the pivot and adapted to rotate the pivot about a bearing. The bottom of the housing is adapted to reflect heat away from the at least one pivot and the bearing.

Other features and aspects of the present invention will become more fully apparent from the following detailed description, the appended claims and the accompanying drawings.

DETAILED DESCRIPTION

Semiconductor wafer processing robots may experience premature failure at the robot wrist assembly. Failures may be caused by build-up of particles, chemical breakdown of lubricants, overheating, and/or other causes. The present invention provides a robot wrist assembly which reduces and/or eliminates various failure modes, including reducing robot wrist temperature.

The present invention improves upon the prior art through temperature reduction, the elimination of problem moving parts, improved bearing performance, and/or improved particle containment and/or heat transfer, among other things. In some embodiments, the improved wrist assembly provides superior cross-section and material selection; thus, the heat flow is improved and/or optimized to restrict conductive and radiated heat flow into the assembly while improving and/or maximizing the heat flow out of the assembly. For example, in some embodiments, the base material, e.g., used for the enclosure, may be titanium, which has a significantly lower thermal conductivity than aluminum in conventional wrist assemblies (e.g., about $\frac{1}{10}$ of the thermal conductivity of aluminum). Additionally, the cross-sectional area of contact surface between the blade and wrist may be significantly reduced by thermal chokes. Both measures reduce heat flow into the assembly. Similarly, by making pivots out of aluminum or the like, heat flow out of the wrist is increased. The larger cross section of these pivots may also increase heat flow out of the wrist.

A radiation shield may be added to the bottom surface of the assembly to reflect radiation from any heating element within a chamber that employs the assembly. The shield may include a simple low cost, sheet metal cover, for example. In some embodiments, the shield may be polished to a mirror finish (e.g., on one side only). Also, inverting the mounting of the bearings from the bottom surface (the conventional position) to the top surface (e.g., a titanium top cap) of the enclosure may reduce the heat transfer from radiation of process chamber heaters as the wrist assembly passes over these heat sources. In some embodiments, the result is a 50% reduction in wrist temperature, which significantly increases lubricant life. It is estimated that lowering the temperature alone will more than double the life of the assembly.

Further protection of the semiconductor wafer from particle contamination in the event of a bearing failure may be created by a labyrinth designed into the base/housing, pivots, and preload rings. Additionally, the opening between the wrist and the blade seen in prior wrist assemblies may be sealed off.

Figure 1:
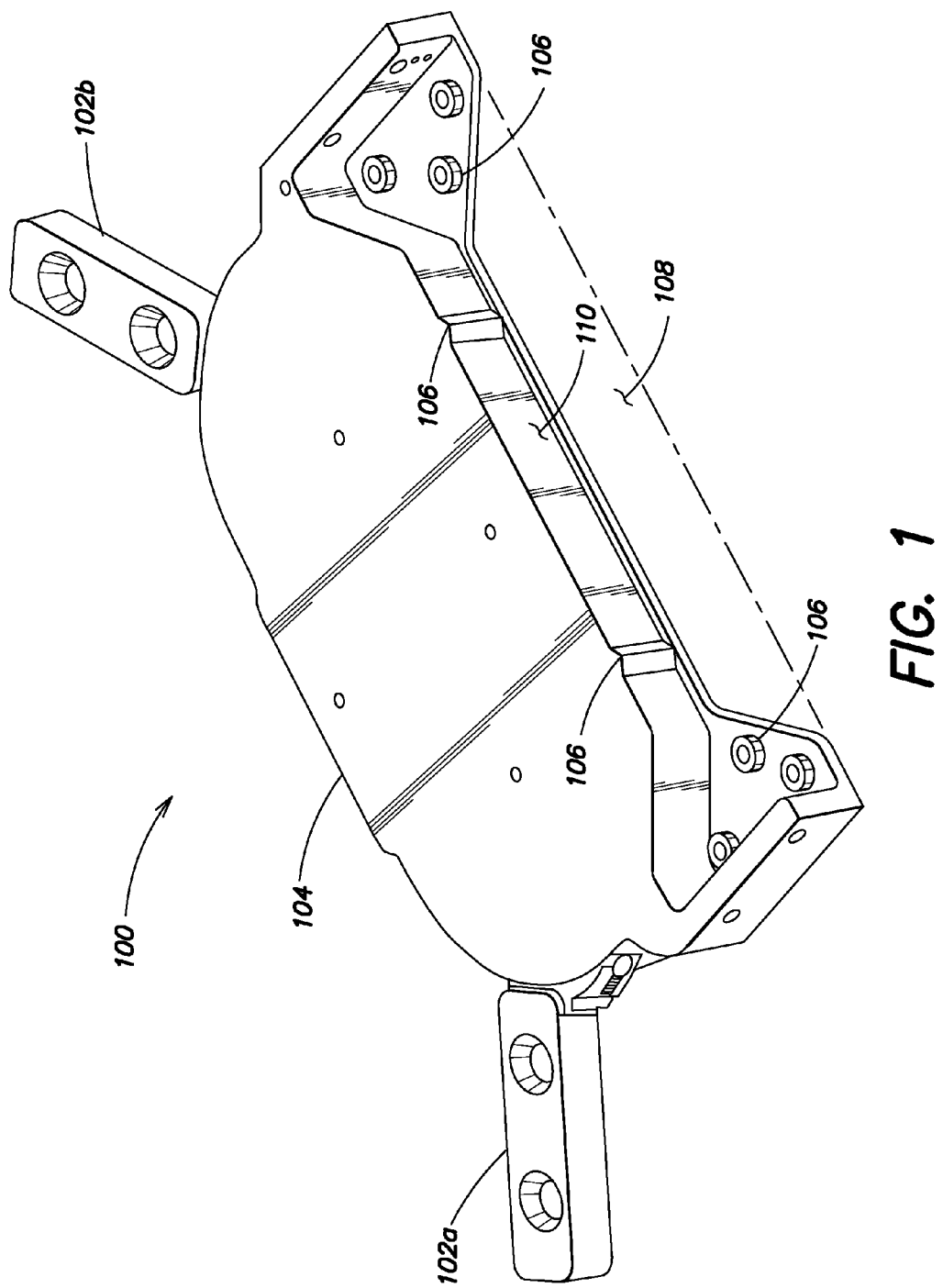
FIG. 1 is a top schematic view of an example robot wrist assembly according to some embodiments of the present invention.

FIG. 1 is a top schematic view of a robot wrist assembly 100 according to some embodiments of the present invention. The robot wrist assembly 100 may be coupled to a robot (e.g., to one or more robot arms) (not shown) by pivots 102a-b. The robot wrist assembly 100 may have a top cap 104 (e.g., a housing or other enclosure). Adjacent and/or coupled to the top cap 104 may be one or more thermal chokes 106. Also adjacent and/or coupled to the top cap 104 may be a cut-away region 108 and a wrist closure 110.

In some embodiments, the pivots 102a-b may be constructed of aluminum. The thermal conductivity of aluminum pivots 102a-b may increase outflow of heat away from the wrist assembly 100. Other materials may be used (e.g., aluminum alloys, and/or other conductive materials). The pivots 102*a-b* may have an increased cross section so as to transfer heat to the arms (not shown) more quickly. For example, in at least one embodiment, the pivots 102*a-b* may have an increased cross sectional area by increasing a height of the pivots (e.g., by doubling the height of the pivots while maintaining about the same pivot width). In one particular embodiment, the pivots may have a cross section of about 3/8" by 1/2", although other dimensions may be used.

In the same or alternative embodiments, the top cap 104 may be constructed of titanium or other similar materials. By using titanium, with a significantly lower thermal conductivity than aluminum, the top cap 104 may assist in preventing excessive heat transfer to the remainder of the wrist assembly 100.

Heat may be restricted further via thermal chokes 106 (e.g., projections from the top cap 104), which may serve to prevent heat from being passed conductively (or otherwise) from a blade (not shown) to the wrist assembly 100 by reducing contact area. Similarly, the cut-away region 108 may minimize contact between the blade (not shown) and the wrist assembly. In some embodiments, the combination of the thermal chokes 106 and the cut-away region 108 may reduce contact area between the blade and the wrist assembly by about 90% over prior wrist assemblies. The thermal chokes 106 may be constructed of a metal, such as titanium, an insulating material, such as ceramic, or any other suitable material.

Wrist closure 110 may be formed as part of top cap 104, or may be a separate piece. In some embodiments, the wrist closure 110 may be constructed of titanium. The wrist closure 104 may reduce and/or eliminate contact between the blade (not shown) and the internal area (shown in FIGS. 2 and 3) of the wrist assembly 100. This may reduce or prevent heat transfer and/or prevent particles from accumulating inside the wrist assembly 100.

Figure 2B:
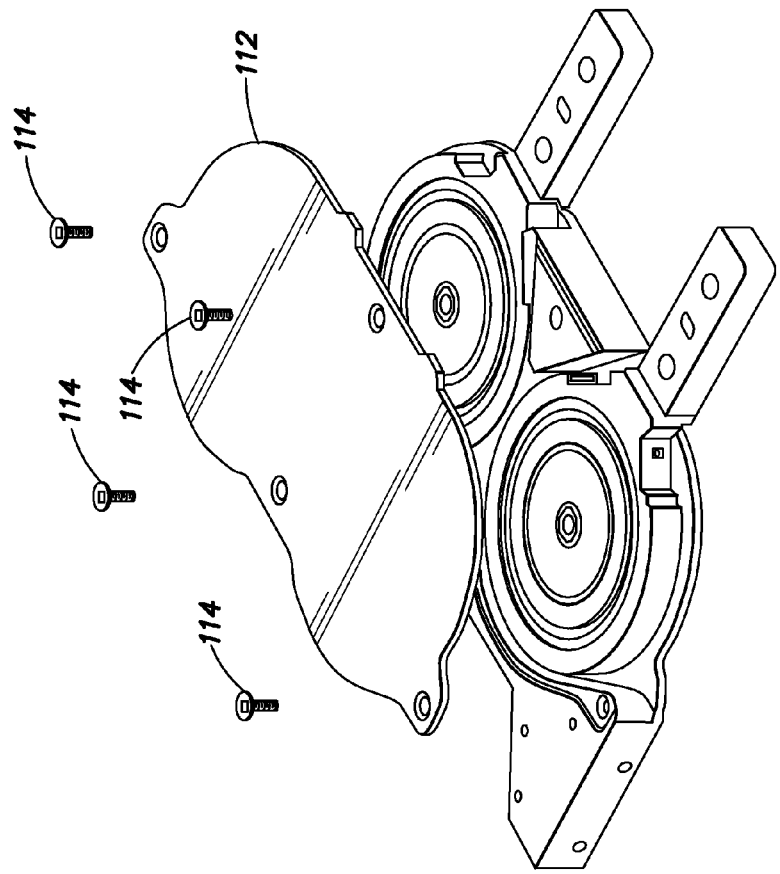
FIGS. 2A and 2B illustrate bottom schematic views of a wrist assembly with a radiation shield secured (2A) and removed (2B), respectively.
Figure 2A:
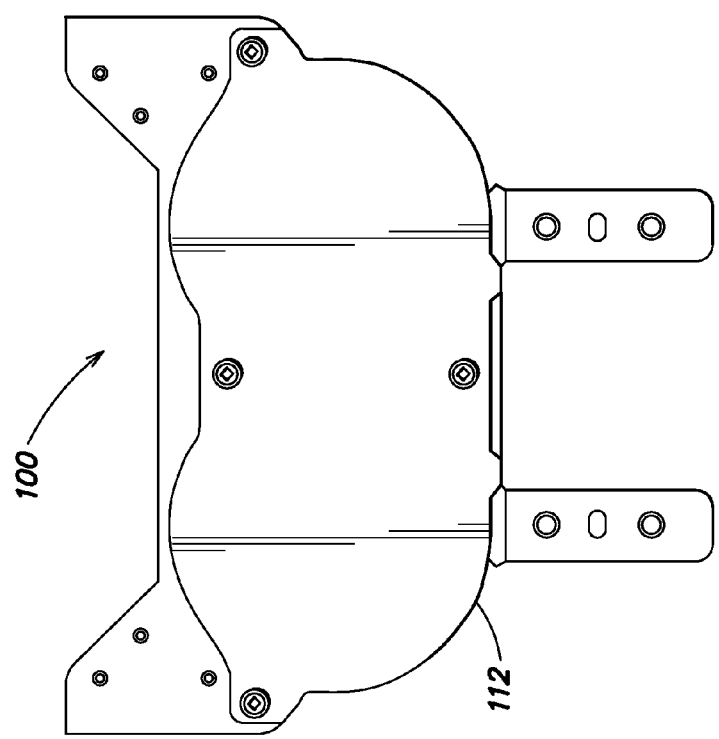

FIGS. 2A and 2B illustrate bottom schematic views of the wrist assembly 100 with a radiation shield 112 secured in place and removed, respectively. The radiation shield 112 may be mounted to the wrist assembly 100 with fasteners 114 (e.g., screws, bolts, or other suitable fasteners). The radiation shield 112 may enclose, along with other portions of the wrist assembly 100 and top cap 104 described above with respect to FIG. 1, the internal area of the wrist assembly 100. This internal area will be described in further detail below with respect to FIG. 3.

The radiation shield 112 may be a sheet metal cover, such as a steel plate, or other similar material. In some embodiments, the radiation shield 112 may be polished to a mirror finish on a side facing away from the internal area of the wrist assembly 100. In this way, the radiation shield 112 may reflect radiation heat away from the wrist assembly 100. Similarly, the radiation shield 112 may be coated and/or plated (e.g., gold plated) to produce a reflective finish. Other materials and/or finishes may be used.

Figure 3:
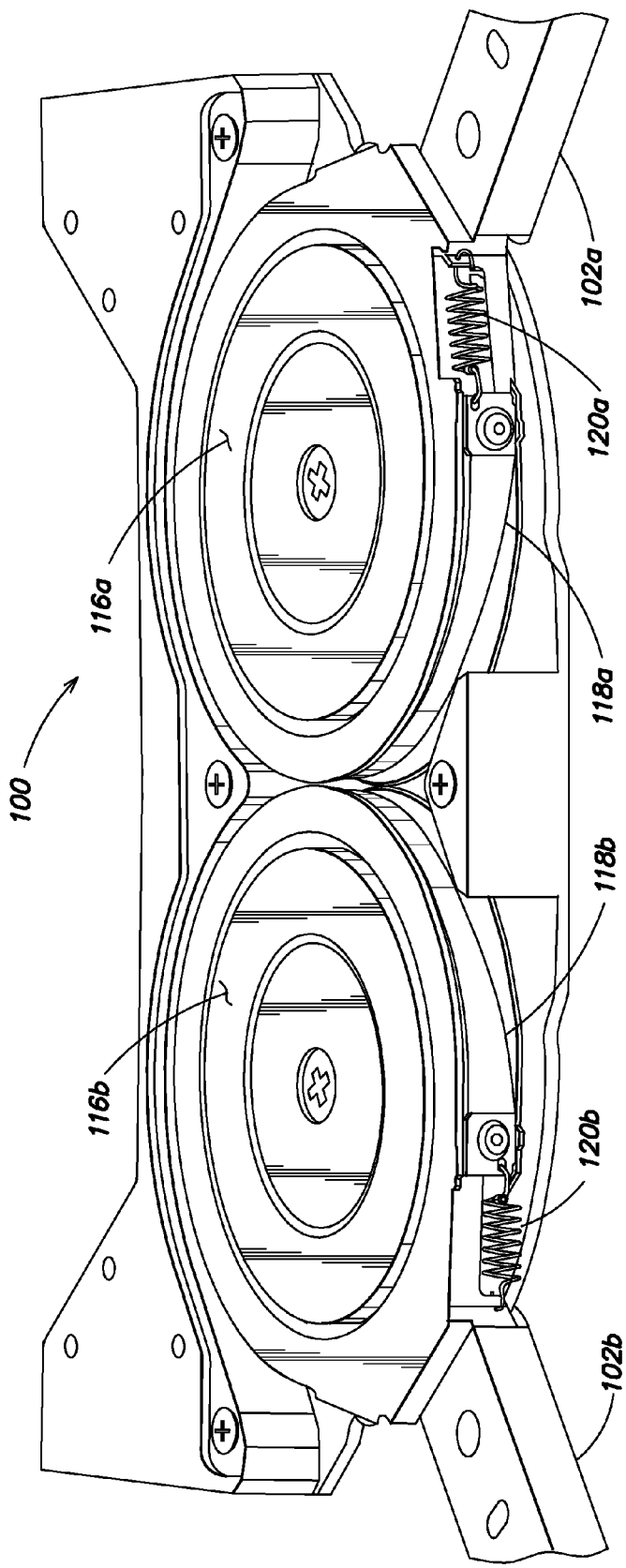
FIG. 3 is a close up bottom schematic view of an example wrist assembly according to some embodiments of the present invention.

FIG. 3 is a close up bottom schematic view of the wrist assembly 100 according to some embodiments of the present invention. Pivots 102*a-b* may be secured to the inside of top cap 104 around bearings 116*a-b*. Pivots 102*a-b* may be actuated by drive belts 118*a-b*. Drive belts 118*a-b* may be secured to the pivots 102*a-b* by tensioners 120*a-b*.

Securing the pivots 102*a-b* to top cap 104 may reduce heat transfer from radiation of process chamber heaters (not shown) as the wrist assembly 100 passes over these heat sources in operation (e.g., because the bearings/pivots are spacially/thermally isolated from the shield 112 which faces the heat sources).

The net effect of the above described features is to concurrently decrease the amount of heat that may enter the wrist assembly (e.g., from the blade and/or a substrate on the blade) and increase the amount of heat that may dissipate out of the wrist (e.g., to the robot arms). Thus, $Q_{out}$ from the wrist assembly is much larger than $Q_{in}$ to the wrist assembly where Q represents heat flow.

Figure 4:
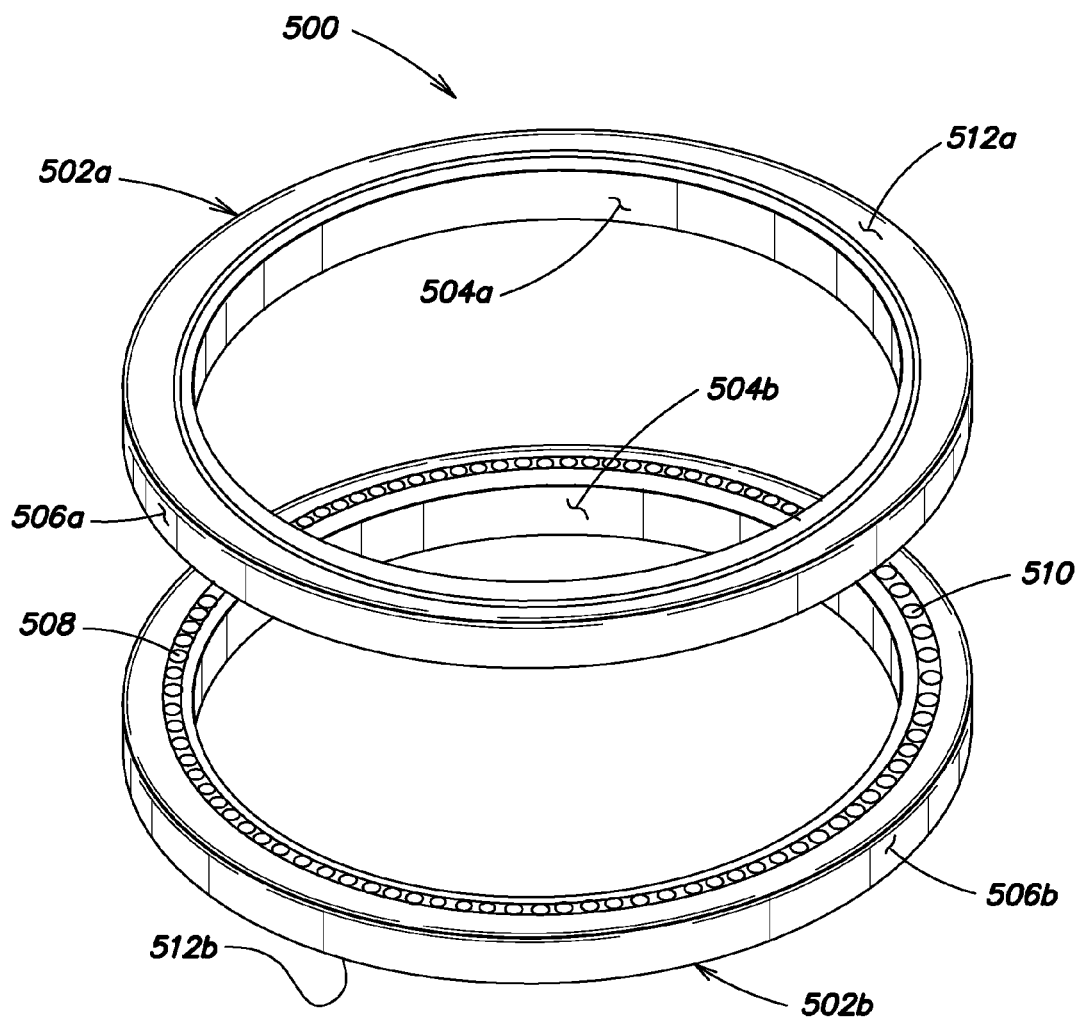
FIG. 4 is an exploded schematic view of an example bearing assembly for use in some embodiments of the present invention.

FIG. 4 is an exploded schematic view of bearing assembly 500, which may be similar to bearings 116*a-b*, for use in some embodiments of the present invention. Bearing assembly 500 may include a one or more bearings 502*a-b*. Bearings 502*a-b* may comprise inner races 504*a-b* and outer races 506*a-b* which may hold spacer balls 508 and/or load balls 510.

In some embodiments, inner races 504*a-b* and outer races 506*a-b* may be constructed of stainless steel 440C or a similar material. Other grade stainless steels and/or other materials may be used. Similarly, spacer balls 508 may be constructed of stainless steel 440C or a similar material. Other grade stainless steels and/or other materials may be used. Load balls 510 may be constructed of ceramic or other appropriate materials. In some embodiments, at least one or more of the load balls 510 may be replaced with a ball made of an electrically conductive material (e.g., stainless steel) that maintains electrical contact between the bearings' 502*a-b* inner races 504*a-b* and outer races 506*a-b*. The conductive replacement ball may be slightly smaller than the non-conductive (e.g., ceramic) load balls 510 so as to be non-load bearing (or to bear less weight than the non-conductive load balls 510) while still maintaining contact between the bearings' 502*a-b* inner races 504*a-b* and outer races 506*a-b*. This contact prevents static electricity from building up in the wrist assembly 100 by allowing a path for the discharge/dissipation of static electricity.

Figure 5:
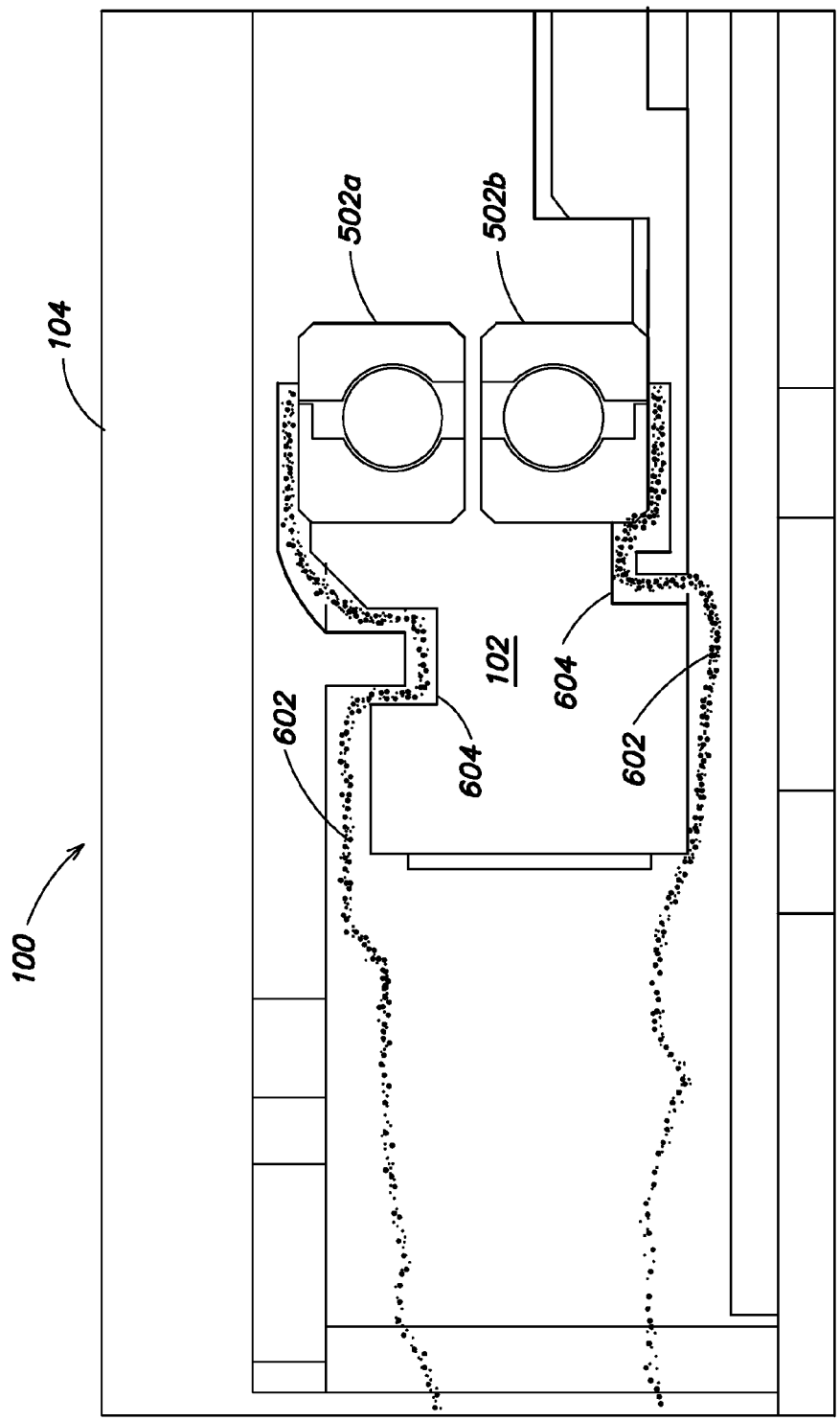
FIG. 5 is a side cut-away schematic view of a portion of a wrist assembly.

FIG. 5 is a side cut-away schematic view of a portion of the wrist assembly 100. Specifically, FIG. 5 illustrates one side of the wrist assembly 100 which includes bearings 502*a-b* and an exemplary path that a particle would have to travel to exit the wrist assembly 100. In the example of FIG. 5, particles 602 leaving the bearings 502*a-b* must travel through a labyrinth 604 designed into the top cap 104 and/or pivot 102, among other things. In the event of a bearing failure, wafers handled by the robot to which the robot wrist assembly 100 is attached are protected from particles 602 dispersed therefrom as the particles 602 would have to travel through the difficult labyrinth 604 path to exit the wrist assembly 100.

Figure 6:
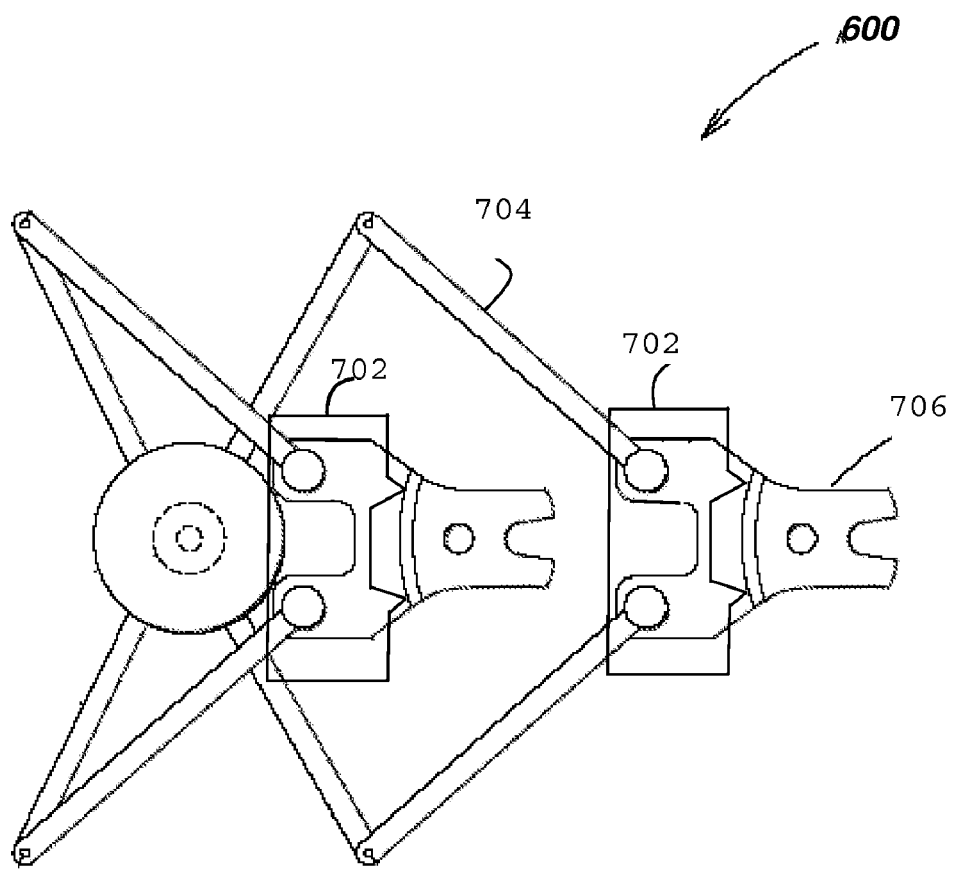
FIG. 6 is a top schematic view of a dual robot including two wrist assemblies according to embodiments of the present invention.

Turning to FIG. 6, a top schematic view of a dual robot 600 including two wrist assemblies 702 is depicted. Each of the wrist assemblies 702 are coupled to robot arms 704 and a blade 706 adapted to carry a substrate. Note that the example wrist assemblies described and depicted in the present application are for "frog-leg" type robots. However, the principles and features of the present invention may be applied to the wrist assemblies of any type of robot including Selective Compliant Articulated Robot Arms (SCARA) and other types of robots.

While the foregoing is directed to embodiments of the present invention, other and further embodiments of the invention may be devised without departing from the basic scope thereof, and the scope thereof is determined by the claims that follow.

What is claimed is:

1. A wrist assembly adapted to be coupled to a blade and robot arm comprising:
   a housing having a cap and a bottom, the housing including
   at least one heat choke and at least one cut away portion
   adapted to minimize contact between the wrist assembly
   and a blade used to hold a substrate, wherein the heat choke is a projection from a surface of the cap, wherein the surface of the cap is opposite the bottom of the housing, the heat choke extending substantially perpendicular from the surface of the cap, the heat choke adapted to space a plane of the blade from the surface of the cap;

one or more pivots mounted only to the cap of the housing and at least partially enclosed in the housing and adapted to be coupled to a robot arm, wherein the placement of the one or more pivots at the cap of the housing results in a reduction in wrist temperature compared to placement at the bottom of the housing; and a belt coupled to the pivot and adapted to rotate the pivot about a bearing, wherein the bottom of the housing is adapted to reflect heat away from the at least one pivot and the bearing.

2. The wrist assembly of claim 1 wherein the housing is constructed of one or more materials selected to restrict heat flow into the wrist assembly.

3. The wrist assembly of claim 2 wherein at least a portion of the housing is constructed of titanium.

4. The wrist assembly of claim 1 wherein the cap of the housing is constructed of a material having a lower thermal conductivity than a material used for the at least one pivot.

5. The wrist assembly of claim 4 wherein the cap is constructed of titanium and the at least one pivot is constructed from aluminum.

6. The wrist assembly of claim 1 wherein the housing further includes a radiation shield adapted to prevent heat from entering the wrist assembly.

7. The wrist assembly of claim 1 wherein the at least one pivot is constructed of a material selected to dissipate heat out of the wrist assembly.

8. The wrist assembly of claim 7 wherein the at least one pivot is constructed of aluminum.

9. The wrist assembly of claim 1 further including a labyrinth adapted to trap particles from the bearing.

10. The wrist assembly of claim 1 wherein the bearing includes non-conductive load balls and at least one conductive ball adapted to maintain electrical conductivity through the bearing.

11. A method of extending a life of a wrist assembly adapted to be coupled to a blade and robot arm comprising:
    attaching a reflective shield to a bottom of the wrist assembly;
    constructing a housing of the wrist assembly from a material having a low thermal conductivity relative to a pivot of the wrist assembly;
    mounting one or more pivots only to a cap of the housing, wherein placement of the one or more pivots at the cap of the housing results in a reduction in wrist temperature compared to placement at a bottom of the housing;
    forming at least one heat choke as a projection from a surface of the cap, wherein surface of the cap is opposite a bottom of the housing, the heat choke extending substantially perpendicular from the surface of the cap, and at least one cut away portion in the housing to minimize contact between the wrist assembly and a blade used to hold a substrate; and
    spacing a plane of the blade from the surface of the cap.

12. A robot for electronic device manufacturing comprising:
    a wrist assembly adapted to be coupled to a blade and robot arm including:
        a housing having a cap and a bottom, the housing including at least one heat choke and at least one cut away portion adapted to minimize contact between the wrist assembly and the blade used to hold a substrate, wherein the heat choke is a projection from a surface of the cap, wherein the surface of the cap is opposite the bottom of the housing, the heat choke extending substantially perpendicular from the surface of the cap, the heat choke adapted to space a plane of the blade from the surface of the cap;
        one or more pivots mounted only to the cap of the housing and at least partially enclosed in the housing and adapted to be coupled to a robot arm, wherein the placement of the at least one pivot at the cap of the housing results in a reduction in wrist temperature compared to placement at the bottom of the housing; and
        a belt coupled to the pivot and adapted to rotate the pivot about a bearing,
        wherein the bottom of the housing is adapted to reflect heat away from the at least one pivot and the bearing.

13. The robot of claim 12 wherein the housing is constructed of one or more materials selected to restrict heat flow into the wrist assembly.

14. The robot of claim 13 wherein at least a portion of the housing is constructed of titanium.

15. The robot of claim 12 wherein the cap of the housing is constructed of a material having a lower thermal conductivity than a material used for the at least one pivot.

16. The robot of claim 15 wherein the cap is constructed of titanium and the at least one pivot is constructed from aluminum.

17. The robot of claim 12 wherein the housing further includes a radiation shield adapted to prevent heat from entering the wrist assembly.

18. The robot of claim 12 wherein the at least one pivot is constructed of a material selected to dissipate heat out of the wrist assembly.

19. The robot of claim 18 wherein the at least one pivot is constructed of aluminum.

20. The robot of claim 12 further including a labyrinth adapted to trap particles from the bearing.

21. The robot of claim 12 wherein the bearing includes non-conductive load balls and at least one conductive ball adapted to maintain electrical conductivity through the bearing.

* * * * *